United States Patent [19]

Worth

[11] Patent Number: 5,114,055
[45] Date of Patent: May 19, 1992

[54] A REINFORCED TUBULAR SEAL

[75] Inventor: John N. Worth, Bolnhurst, England

[73] Assignee: W. R. Grace & Co.-Conn., New York, N.Y.

[21] Appl. No.: 638,287

[22] Filed: Jan. 7, 1991

[30] Foreign Application Priority Data

Jan. 9, 1990 [GB] United Kingdom ............... 9000426

[51] Int. Cl.$^5$ ........................................... F16K 41/00
[52] U.S. Cl. ............................ 222/542; 222/559;
251/214; 251/335.1; 277/62; 277/165
[58] Field of Search ............... 222/504, 509, 510, 512,
222/518, 542, 559; 251/214, 319, 335.1, 330,
331, 335.2, 318; 277/59, 61, 62, 106, 165

[56] References Cited

U.S. PATENT DOCUMENTS

| 2,964,246 | 12/1960 | Alholm et al. | 222/504 |
| 3,976,392 | 8/1976 | Bolin | 415/110 |
| 4,359,204 | 11/1982 | Williams | 251/331 |
| 4,798,314 | 1/1989 | Worth et al. | 222/542 |

FOREIGN PATENT DOCUMENTS

| 509315 | 1/1938 | United Kingdom |
| 2046373 | 3/1979 | United Kingdom |
| 2189008 | 4/1986 | United Kingdom |
| 2194822 | 9/1986 | United Kingdom |
| 2062132 | 10/1990 | United Kingdom |

Primary Examiner—Kevin P. Shaver
Attorney, Agent, or Firm—John Dana Hubbard; William L. Baker

[57] ABSTRACT

A dispensing nozzle for a liquid composition having a needle valve and a reinforced tubular seal. The seal has an upper disc-like portion which is secured in place and a lower tubular extension. The tubular extension has an internal tapered bore such that its lower end is narrower than its upper end. The lower end of the bore grips the outer surface of the needle valve and stretches and contracts with its movement. The inner bore of the seal above the lower end is held clear of the needle valve member by a helical spring.

7 Claims, 1 Drawing Sheet

A REINFORCED TUBULAR SEAL

The present invention relates to an improved seal, and in particular to a seal for use with an elongate member which is slidable into and out of a space in which a liquid is to be contained. One example of such a situation is that of a needle valve controlling the discharge of a liquid from within a chamber where the needle valve extends through the chamber from one side to the other.

BACKGROUND OF THE INVENTION

In the past adequate sealing has been achieved, particularly in the case of a longitudinally movable elongate member, using a diaphragm seal where the diaphragm extends between the periphery of the elongate member and a surrounding housing. Such a situation is illustrated in FIG. 1 from which it can be seen that the space 1 under the diaphragm 2 will vary in volume considerably as the elongate member (needle valve member 3) to be sealed is longitudinally displaced in a vertical direction. In the case of controlled dispensing of a liquid from within the space 1 through a nozzle 4, the pressure within the space 1 will fluctuate giving undesirable fluctuations in the rate of discharge of the liquid introduced along the direction of arrow 5.

An alternative form of seal which has not been subject to this fluctuation in the volume of the space 1 is the stuffing box seal, in this case a chevron shaft seal, shown at 2a in FIG. 2 which is another prior art arrangement. However, the fact that the needle valve member 3 slides relative to the chevron seals of the assembly 2a causes wear in the seals with the result that some of the liquid which has been introduced at 5 into the space 1 can escape vertically upwardly and, particularly in the case of liquids which may be shear-sensitive there is a risk of agglomeration of the material at the seal, with undesirable consequences.

SUMMARY AND OBJECTS OF THE INVENTION

It is an object of the present invention to provide a seal about a movable longitudinal member, which does not depend on sliding of the longitudinal member relative to the seal and equally does not involve the use of a membrane or diaphragm which flexes to vary the volume of the space around the elongate member.

According to the present invention there is provided a seal for an elongate valve member movable longitudinally relative to a housing, comprising: an elongate annular seal member having an internal bore therealong receiving said elongate valve member; means for clamping a first end of the elongate annular seal member relative to said housing, the elongate seal member having its second end in sealing contact with the exterior of the elongate valve member in said bore thereof; and means within said bore between said first and second ends of the seal member clear of a said elongate valve member even when the exterior of said seal member is subject to a pressure greater than that to which the interior is subjected.

A preferred form of the present invention is a dispensing gun for a liquid composition, comprising a dispensing chamber for the liquid composition and a needle valve projecting across the chamber to close off a discharge orifice of the chamber from within the chamber, the point of entry of the needle valve member into the chamber being sealed by means in accordance with the present invention.

IN THE DRAWINGS

In order that the present invention may more readily be understood the following description is given, merely by way of example, with reference to the accompanying drawings in which.

DETAILED DESCRIPTION

Figure 3:
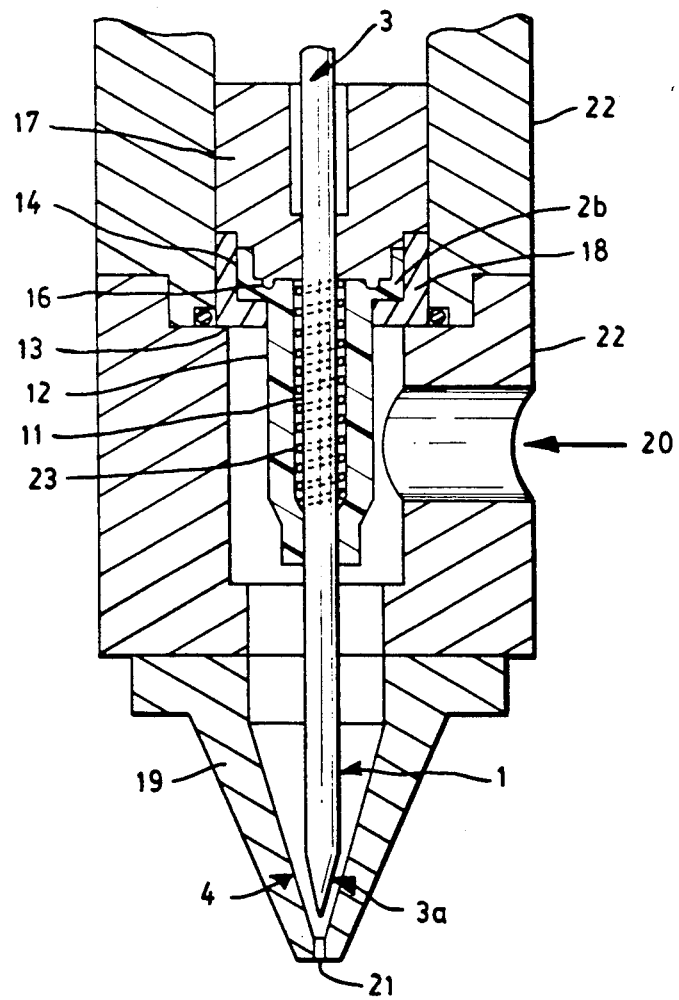
FIG. 3 is a similar view but showing a seal in accordance with the present invention.

Referring now to FIG. 3 which embodies the present invention, the seal 2b in this case comprises a long tubular extension 11 joined to a disc-like portion 12 which in turn is joined at 13 to an annular locating skirt 14. The seal 11, 12 is held by the disc-like portion 12 being clamped between a male seal clamping body 17 and a female clamping body 18 which form part of the fixed housing of a dispensing chamber for liquid composition in the space 1 within the dispenser body of a dispensing gun for the liquid. An annular spigot 16 of the male seal clamping body 17 locally compresses the upper surface of the disc-like portion 12 to increase the sealing pressure between the male seal clamping portion 17 and the disc-like seal portion 12.

In order further to locate the seal in place, a female seal clamping body 18 is provided and the male clamping body 17 fits into a recess thereof so as to trap the disc-like portion 12 and the locating skirt 14 of the seal 2b in place.

The housing of the dispenser is completed by a nozzle body 19 which includes an inlet at 20 and a nozzle orifice 21 to be closed by the tip 3a of the longitudinally movable elongate needle valve member 3.

Once a liquid under pressure for dispensing through the nozzle orifice 21, has been introduced into the space 1 its pressure will hold the lower end of the elongate sleeve portion 11 of the seal in contact with the cylindrical exterior of the longitudinally movable needle valve member 3. Although not evident in FIG. 3, the elongate extension 11 is deliberately given an internal taper such that its interior is more likely to contact the needle valve member 3 near the lower end or tip of the extension 11 than it is higher up the needle valve member 3, thereby allowing some degree of longitudinal movement of the needle valve member 3 relative to the upper parts of the extension 11.

In addition to this taper, which helps to keep the interior of the majority of the extent of the extension 11 clear of the cylindrical outside surface of the needle valve member 3, there is a helical spring 23 positioned within the bore of the extension 11 and around the exterior of the needle valve member 3, helping to maintain the interior of the seal member 2b clear of the exterior of the needle valve member. Thus the portion of the extension 11 between the tip end which is clearly in intimate contact with the exterior of the needle valve member 3 and the clamped disc-like portion 12 which is clearly held in the body between the male seal clamping portion 17 and the female seal clamping body 18 is able to deform by extension and contraction, and to a slight extent by radial deformation but without contacting, and sticking on, the exterior of the needle valve member 3.

This has the advantage that the possibility of travel of the needle valve member 3 without damaging the extension 11 of the seal 2b is much greater, when using a seal material having the same elasticity characteristics.

To some extent also, the external pressure to which the extension 11 of the seal 2b may be subjected without resulting in this damaging sticking of the interior of the extension 11 against the outer cylindrical surface of the needle valve member 3 is also increased by use of the coil spring 23.

In use, the lower end of the extension 11 will intimately grip the exterior of the needle valve member 3 so that when the needle valve is moved downwardly the extension 11 will be stretched axially as the needle valve member 3 moves longitudinally within the interior of the extension 11. During this time the disc-like portion 12 and the locating skirt 14, being held in place by engagement of the male and female seal clamping bodies 17 and 18, ensure that the upper end of the extension 11 is held stationary relative to the axially movable lower end, giving rise to expansion and contraction of the extension 11. It should of course be appreciated that as the extension 11 expands and contracts longitudinally there will be a change in its external cross-section which will b in the form of a decrease when the length of the extension 11 is becoming larger, and vice versa.

It should also be noted that thanks to the existence of the coil spring 23, and to some extent the internal taper of the extension 11, there is substantially no sliding of the interior wall surface of the extension 11 relative to the needle valve member 3 which it encloses, and thus there will be no wear of the fit of the seal in repeated use of the needle valve.

The needle valve may be operated by any suitable drive mechanism, for example by mechanical means, electrical means, pneumatic means, or hydraulic means, or a combination thereof.

Any suitable elastomeric material may be used for the seal member 2b, and one example is natural rubber.

Because of the more efficient holding of the extension 11 clear of the outside cylindrical surface of the needle valve member 3, it is possible to use a rubber having a less favorable elasticity characteristic (i.e. less resilient rubber) for the same application, thereby enabling synthetic rubbers to be used in environments where, without the spring 23, it would be necessary to use a natural rubber on account of its higher elasticity. Thus, the improved seal in accordance with the present invention is able to be made of a fluorocarbon rubber such as that known under the tradename Viton and can be used in environments where the seal has to be inert to a hydrocarbon solvent; nitrile rubber, neoprene rubber, or polyurethene rubbers may be used in environments where the seal is to be inert to phthalate plasticizers, or hydrocarbon solvent-based compositions, or various other media.

Figure 1:
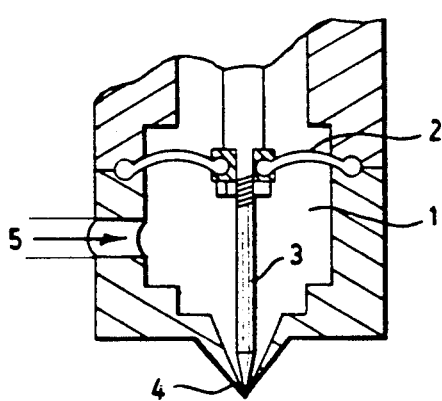
FIG. 1 is a vertical sectional view of a first prior art arrangement using a diaphragm seal.
Figure 2:
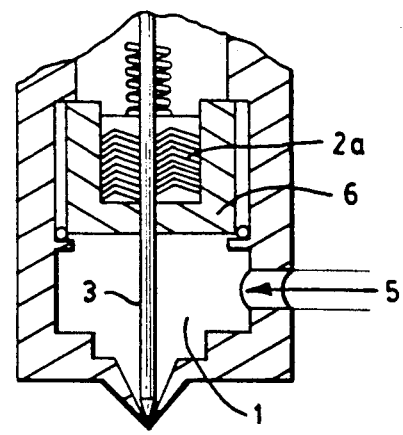
FIG. 2 is a view similar to FIG. 1 but showing a second prior art arrangement using a sliding chevron seal.

As indicated above, there are serious disadvantages in the use of the diaphragm seal shown in FIG. 1 or the stuffing box "chevron" type of seal shown in FIG. 2. With the FIG. 1 arrangement the diaphragm displaces vertically in such a way as to change the volume of the chamber 1 so that the pressure of the liquid in the chamber will also fluctuate and will give rise to undesirable changes in the rate of discharge through the nozzle orifice.

Experiments have proven that the gaiter seal provides a better performance than the diaphragm gun with respect to the evenness of compound distribution on the can end.

The gaiter seal of FIG. 3 is thought better than the diaphragm of FIG. 1 in that as the needle valve 3 rises to open the nozzle orifice the pressure in the chamber 1 drops and hence the rate of discharge of the liquid composition from within the chamber 1 will drop until it can be restored as a result of the pressure recuperation of the continued feed into the chamber at 5. A further disadvantage of the diaphragm seal is that even while the needle valve 3 is stationary the diaphragm is able to displace, for example by a fluttering movement when the valve is open, and thus the pressure varies undesirably.

An additionally advantage of the gaiter seal over the stuffing box seal of FIG. 1, when used with a gun operated independently of the machine, i.e. air operated via a solenoid, is that there is reduced friction between the needle and the flange seal area which provides for a more consistent operation.

With the FIG. 2 arrangement there is no such variation in volume of the chamber 1 but the sliding of the needle valve member 3 relative to the stuffing box seal assembly 2a will give rise to wear of the sliding fit and eventual leakage of liquid composition upwardly along the needle valve with a risk of contamination of the drive mechanism for the needle valve member 3. Furthermore, the high shear generated around the needle valve member 3 at the stuffing box assembly 2a and at the orifice of the surrounding part of the stuffing box support member 6 of FIG. 2, has been found to give rise to coagulation of the liquid composition being dispensed, particularly in the case of shear-sensitive compositions, such as water based dispersions, with the risk of coagulated particles of the composition being formed which may particularly block the nozzle orifice 21 so as to reduce the rate of discharge of the contents of the chamber 1 or even completely block it. One example of a liquid composition which may be coagulated by the high shear forces generated in a seal of this type is a water based can sealing compound which may comprise an aqueous styrene-butadiene rubber latex, tackifying resin, filler, dispersant and thickening agent.

With the seal illustrated in FIG. 3, constructed in accordance with the present invention, no such change of volume disadvantage of FIG. 1 is noticed and equally there is substantially not risk of coagulation of the liquid composition or of contamination of the needle valve member drive mechanism through escape of liquid composition from the chamber 1 upwardly along the needle valve member 3.

When dispensing water based sealing compound for can lining, using a seal in accordance with the present invention, it has been found in preliminary tests that there are minimal pressure surges in the compound, to the extent that no problem arises, and nevertheless adequate seal is provided without any noticeable incidence of coagulation of the compound.

Furthermore, the efficiency of sealing is maintained over a long period despite the frequent displacements of the needle valve member 3.

While the invention has been described with reference to its preferred embodiments, it would be obvious to one skilled in the art that other variations and no difilations may be made in the invention without departing from its true spirit and scope. It is therefore intended in the appended claims to cover all such equivalent variations and modifications as full within the true spirit and scope of this invention.

What is claimed:

1. A seal for an elongate valve member movable longitudinally relative to a housing, comprising: an elongate annular seal member having an internal bore therealong receiving said elongate valve member; means for clamping a first end of the elongate annular seal member relative to said housing, the elongate seal member having its second end in sealing contact with the exterior of the elongate valve member in said bore thereof; and means within said bore between said first and second ends of the seal member for holding an axially extending portion of said seal member clear of a said elongate valve member even when the exterior of said seal member is subject to a pressure greater than that to which the interior is subjected.

2. A seal according to claim 1 wherein, said means within the bore comprise a helical spring.

3. A seal according to claim 1, wherein the interior of said elongate annular seal member has a tapering form whereby the smallest internal cross-section occurs at said second end.

4. A seal according to claim 1, wherein said elongate annular seal member has a circular internal cross-section.

5. A seal according to claim 4, wherein said elongate annular seal member has a circular external cross-section.

6. A dispensing device for liquid compositions comprising a housing having a dispensing chamber, a drive mechanism, a needle valve extending from the drive mechanism through the dispensing chamber and movably closing a nozzle orifice located at an end of the dispensing chamber for the most from the drive mechanism, the dispensing housing containing a male and female clamping body adjacent the drive mechanism, a seal clamped between the male and female bodies, which seal separates the drive mechanism from the dispensing chamber, the seal being an elongate seal member with an internal bore through which the needle valve extends, the seal having a first end retained between the male and female clamping bodies and a second end in sealing contact with the exterior of the needle valve member in said bore thereof; and means within said bore between said first and second ends of the seal member for holding an axially extending portion of said seal member clear of a said elongate valve member even when the exterior of said seal member is subject to a pressure greater than that to which the interior is subjected.

7. A dispensing apparatus according to claim 6, when comprising part of a device for injecting sealing compound for defining sealing gaskets in closures, for example bottle caps and can ends.

* * * * *